(12) United States Patent
Dachauer et al.

(10) Patent No.: US 10,760,740 B2
(45) Date of Patent: Sep. 1, 2020

(54) LIQUIEFYING A GASEOUS MEDIUM

(71) Applicant: Linde Aktiengesellschaft, Munich (DE)

(72) Inventors: Christian Dachauer, Pfungen (CH);
Hanspeter Wilhelm, Steinmaur (CH);
Lukas Keller, Winterthur (CH)

(73) Assignee: Linde Aktiengesellschaft, Munich (DE)

( * ) Notice: Subject to any disclaimer, the term of this patent is extended or adjusted under 35 U.S.C. 154(b) by 163 days.

(21) Appl. No.: 16/042,215

(22) Filed: Jul. 23, 2018

(65) Prior Publication Data

US 2019/0032854 A1    Jan. 31, 2019

(30) Foreign Application Priority Data

Jul. 25, 2017 (GB) .................................. 1711979.3

(51) Int. Cl.
*F17C 3/08* (2006.01)
*B63B 25/16* (2006.01)
(Continued)

(52) U.S. Cl.
CPC ............... *F17C 13/04* (2013.01); *F17C 3/08* (2013.01); *F17D 1/082* (2013.01); *F25J 1/001* (2013.01);
(Continued)

(58) Field of Classification Search
CPC ...... F25J 1/0025; F25J 2270/912; F25J 1/004; F25J 1/0045; F25J 1/0202; F25J 1/023;
(Continued)

(56) References Cited

U.S. PATENT DOCUMENTS 4,667,390 A * 5/1987 Acharya ............... F16L 59/065
220/560.03
4,675,037 A * 6/1987 Newton ................. F25J 1/0247
62/48.2
(Continued)

FOREIGN PATENT DOCUMENTS

FR    2399381 A1    3/1979
JP    2000-291892 A    10/2000
(Continued)

OTHER PUBLICATIONS

Search Report dated Jan. 17, 2018 issued in corresponding GB 1711979.3 application (1 page).

*Primary Examiner* — Frantz F Jules
*Assistant Examiner* — Erik Mendoza-Wilkenfel
(74) *Attorney, Agent, or Firm* — Millen White Zelano & Branigan, PC; Brion P. Heaney

(57) ABSTRACT

An arrangement comprising at least one liquefaction plant for liquefying a gaseous medium to produce a liquefied medium; and at least one storage tank for storing the liquefied medium. A first transfer line is provided which is connected between the liquefaction plant and the storage tank, for transferring liquefied medium from the liquefaction plant into the storage tank. A second transfer line is connected between the liquefaction plant and the storage tank, for transferring gaseous medium from the storage tank into the liquefaction plant. The second transfer line, which used for transferring medium from the storage tank into the liquefaction plant, is arranged so that it is routed at least partially through the area of the storage tank in which the liquefied medium is stored in use.

17 Claims, 2 Drawing Sheets

(51) Int. Cl.
   *F17C 13/04*  (2006.01)
   *F17D 1/08*  (2006.01)
   *F25J 1/00*  (2006.01)
   *F25J 1/02*  (2006.01)

(52) U.S. Cl.
   CPC ............ *F25J 1/004* (2013.01); *F25J 1/0005* (2013.01); *F25J 1/0007* (2013.01); *F25J 1/0015* (2013.01); *F25J 1/0017* (2013.01); *F25J 1/0022* (2013.01); *F25J 1/0247* (2013.01); *F17C 2205/0323* (2013.01); *F17C 2205/0355* (2013.01); *F17C 2205/0388* (2013.01); *F17C 2221/011* (2013.01); *F17C 2221/012* (2013.01); *F17C 2221/014* (2013.01); *F17C 2221/016* (2013.01); *F17C 2221/033* (2013.01); *F17C 2223/0123* (2013.01); *F17C 2223/043* (2013.01); *F17C 2225/013* (2013.01); *F17C 2225/043* (2013.01); *F17C 2227/04* (2013.01); *F17C 2260/031* (2013.01); *F25J 2215/32* (2013.01); *F25J 2245/02* (2013.01); *F25J 2245/90* (2013.01); *F25J 2290/62* (2013.01)

(58) Field of Classification Search
   CPC . F25J 1/0277; F17C 3/08; F17C 3/085; F17C 3/025; F17C 2205/0388; F17C 2265/033; F17C 2265/034; F02M 21/0221; B63B 25/16; F25B 2500/26
   See application file for complete search history.

(56) References Cited

U.S. PATENT DOCUMENTS

| | | | | |
|---|---|---|---|---|
| 4,898,006 A | * | 2/1990 | Fencl | ...................... F25B 45/00 |
| | | | | 62/48.2 |
| 2008/0197137 A1 | * | 8/2008 | Schlag | ...................... F17C 3/08 |
| | | | | 220/560.12 |
| 2015/0007585 A1 | * | 1/2015 | Kawai | ...................... F17C 6/00 |
| | | | | 62/48.2 |

FOREIGN PATENT DOCUMENTS

| | | |
|---|---|---|
| WO | 2007/011155 A1 | 1/2007 |
| WO | 2013/058308 A1 | 4/2013 |

* cited by examiner

LIQUEFYING A GASEOUS MEDIUM

FIELD OF THE INVENTION

The invention relates to an arrangement for liquefying a gaseous medium having at least one storage tank used for storing the liquefied medium. The invention further relates to a method for cooling the transfer lines prior to use.

BACKGROUND OF THE INVENTION

The term "liquefaction plant" is understood to mean any plant or any process that is used for cooling and liquefying a gaseous medium, for example, hydrogen, a noble gas such as helium, neon, etc., oxygen, nitrogen, or a hydrocarbon mixture, in particular natural gas.

In known arrangements, there is provided at least one liquefaction plant for liquefying a gaseous medium and at least one storage tank which is used to store the liquefied medium. Generally, two transfer lines are provided which connect the liquefaction plant and the storage tank. A first transfer line is used to transfer the liquefied medium from the liquefaction plant to the storage tank, and a second transfer line (a return line) is used to transfer the flash and boil-off gas of the liquefied medium from the storage tank to the liquefaction plant. It is usual to provide a mechanism, such as a shut-off valve, in each transfer line which can be activate to stop the flow in the transfer line.

Usually, the transfer lines are vacuum insulated lines. By providing two, distinct and physically separated transfer lines between liquefaction plant and storage tank, it is possible at the same time to transfer liquefied medium from the liquefaction plant into the storage tank and gaseous medium from the storage tank into the liquefaction plant.

A typical known arrangement is shown in FIG. 1. A liquefaction plant V represented simply as a black box is connected to a represented storage tank S having an outer tank 1 and an inner tank 2. The arrangement includes a first transfer line 3, in which a shut-off valve a is arranged. The medium liquefied in the liquefaction plant V is supplied to the storage tank S through line 3. A second transfer line 4 is provided, in which a shut-off valve b is arranged, is provided. Gaseous medium is transferred from the storage tank S into the liquefaction plant V through second transfer line 4 (which can also be referred to as a return line). The outlet of transfer line 3 and the inlet of the return transfer line 4 are located in an upper portion of the storage tank S. This portion of the storage tank S generally does not contain liquefied medium when the arrangement is in use.

In this known arrangement, the two transfer lines are arranged at the same side of the storage tank as shown in FIG. 1, and this can cause problems in the start-up and normal operation of the apparatus.

In operation, when the flash and boil-off gas, for example, gaseous helium, is withdrawn from the storage tank, changes in the temperature of the gaseous helium in the storage tank are transferred to apparatus downstream of the return line. When the gaseous helium is sent back to a liquefaction plant, changes in the return temperature can have a negative effect on the efficiency of the liquefaction plant. Changes in the return gas temperature occur mainly as a result of temperature stratification in the storage tank, for example, if the gas compartment sees only little flow (for example, in partial load drops, after plant start-up, in very large tanks) or when warm gas is fed into the storage tank from another source.

When the helium is continuously fed into the storage tank in the form of a two-phase mixture consisting of liquid helium and gaseous helium and at the same time continuous removal of gaseous helium from the storage tank is carried out, a bypass flow can occur and cause at least a partial flow of liquid helium back through the return transfer line.

The storage tank may need to be cooled (for example in the start-up phase of operation) by circulating cold, gaseous helium through the storage tank. Since the outlet of first transfer line 3 is in close proximity to the inlet of second transfer or return line 4, the cold gaseous helium passes only through a limited range of the tank volume and passes quickly back into the return line. In other words, the cold gaseous helium does not remain in the storage tank for any significant time, and this means it can take a long time to cool the tank down sufficiently.

Embodiments of the invention seek to provide an apparatus which overcome some or all of these problems.

SUMMARY OF INVENTION

According to a first aspect, there is provided an arrangement or system comprising at least one liquefaction plant for liquefying a gaseous medium to produce a liquefied medium, at least one storage tank for storing the liquefied medium, a first transfer line connected between the liquefaction plant and the storage tank for transferring liquefied medium from the liquefaction plant into the storage tank, a second transfer line connected between the liquefaction plant and the storage tank, for transferring gaseous medium from the storage tank into the liquefaction plant, wherein the second transfer line used for transferring medium from the storage tank into the liquefaction plant is arranged so that it is routed at least partially through the area of the storage tank in which the liquefied medium is stored in use.

An outlet of the first transfer line into the storage tank is provided adjacent to a first side wall of the tank and an inlet of the second transfer (return) line is provide adjacent to a second side wall, provided on the side of the tank opposite to the side first wall.

At least one shut-off valve may be provided in each transfer line. The apparatus may further include a bypass line connecting the first and second transfer lines. A bypass shut-off valve may be provided in the by-pass line. The bypass line may connect the transfer lines at a point between the liquefaction plant and the transfer line shut-off valves.

The apparatus may include one first transfer line and one second transfer line. The by-pass line may connect the first transfer line to the second transfer line. The apparatus may comprise multiple first transfer lines and multiple second (return) transfer lines. Where multiple first and second transfer lines are provided, further by pass lines may be provided. For example, a secondary by-pass line may be provided between secondary first and second transfer lines.

The arrangement may comprise control element. The control element may be configured such that, after a standstill phase of the liquefaction plant and before the transfer of liquefied medium from the liquefaction plant into the storage tank, it (the control element) carries out a transfer line cooling phase. The cooling phase may comprise that the control element closes the shut-off valves of the transfer lines and opens the bypass line shut-off valve, so that liquefied medium is led from the liquefaction plant via partial sections of the transfer lines and the bypass line back into the liquefaction plant.

The bypass line may be arranged substantially adjacent to the storage tank.

The arrangement may comprise a first transfer line having a first shut-off valve. The arrangement may comprise a second transfer line having a second shut-off valve. The bypass line may be connected between a point on the first transfer line upstream of the first shut-off valve (a) and a point on the second transfer line downstream of the second shut-off valve.

An outlet of the first transfer line into the storage tank may be provided adjacent to a first side wall of the tank. An inlet of the second transfer line may be provide adjacent to a second side wall, provided on the side of the tank opposite to the side first wall.

The transfer line used for transferring medium from the storage tank into the liquefaction plant may be arranged so that it is substantially entirely routed through the area of the storage tank in which the liquefied medium is stored in use.

The storage tank may be a double-walled tank. The storage tank may have an outer tank and an inner tank. The storage tank may be a double-walled, vacuum insulated storage tank.

At least some of the transfer lines may be vacuum insulated. Alternatively, all of the transfer lines may be vacuum insulated.

By means of this implementation, during the start-up phase of operation, cold gaseous medium, for example, gaseous helium, is transferred through the first transfer line into the storage tank and is expelled into the tank from the outlet of the first transfer line at one side of the tank. The cold gas passes across the storage tank to the inlet of the return line, which is provided at or near the opposite side of the storage tank. This means that the cold, gaseous helium passes through a significant portion of the tank inner volume, and spends a greater time within the tank, thereby providing a greater cooling effect on the storage tank. The result is that the cooling phase of the start-up operation is reduced. Moreover, the cooling of the storage tank from the raised temperature (which can be up to the ambient temperature in the case of a long shut down) to the desired operational temperature, i.e. to liquid helium temperature, is more efficient.

Further, during normal operation, the liquid medium, for example, liquid helium, fed into the tank through the first transfer line enters the tank through the first transfer line outlet and settles (or drops) in the tank. This means that the proportion of the liquid helium which directly exits through the return line is reduced.

According to a second aspect, there is provided a method for cooling the transfer lines of an arrangement as described in any of the statements above, after a standstill phase of the liquefaction plant, the method comprising
  operating in a cooling mode which includes
    feeding the liquid medium through a by-pass line connected the first transfer line and the second transfer line, so as to by-pass the storage tank,
  switching to a normal transfer mode comprising
    transferring the liquefied medium from the liquefaction plant into the storage tank.
  The cooling mode may comprise:
  closing the transfer line shut-off valves, and
  opening the bypass line shut-off valve so that liquefied medium is led from the liquefaction plant via the transfer lines and the bypass line back into the liquefaction plant.

The cooling mode may be carried out until a predetermined temperature has been reached in at least one defined section of the transfer lines.

The medium to be liquefied may be hydrogen, a noble gas, in particular helium, neon or argon, oxygen, nitrogen, or a hydrocarbon mixture, more particularly a natural gas.

According to the invention, during the cooling phase, the medium flow circulating through the transfer lines is no longer fed through the storage tank, so that no introduction of heat from the transfer lines to be cooled into the storage tank occurs during the cooling phase. The evaporation of medium stored in the storage tank is thus reduced or completely avoided when the liquefaction plant is started up again, which results in the implementation of a more stable operation of the liquefaction plant, and the risk of activation of the pressure safety system of the storage tank can be reduced.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which.

DESCRIPTION OF EMBODIMENTS

Figure 1:
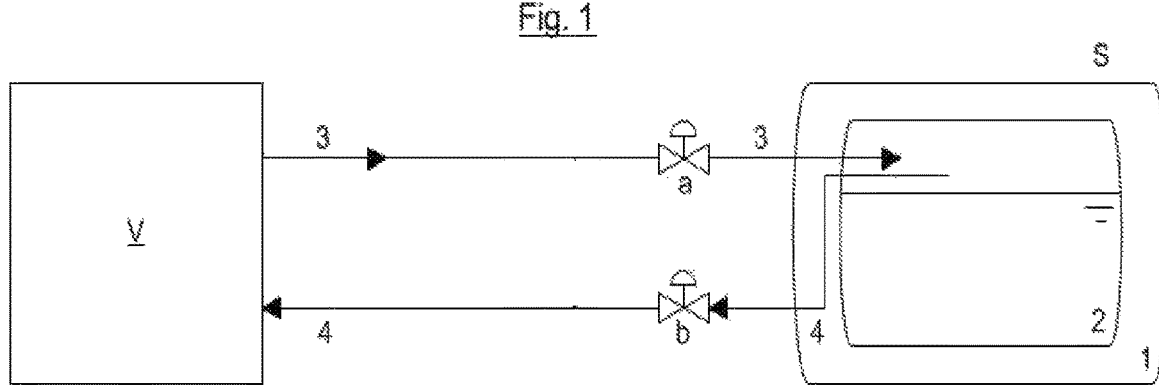
FIG. 1 shows a previously known arrangement.

The figures each show a liquefaction plant V represented simply as a black box, as well as a diagrammatically represented storage tank S. In general, said storage tank comprises an outer tank 1 as well as an inner tank 2, wherein the clearance between inner tank and outer tank is designed to be vacuum insulated.

FIGS. 2 to 5 show various embodiments of invention which all provide an improved operation over the previously known arrangement described above. In FIGS. 2 to 5 similar components are given the same reference numerals as in FIG. 1.

Figure 2:
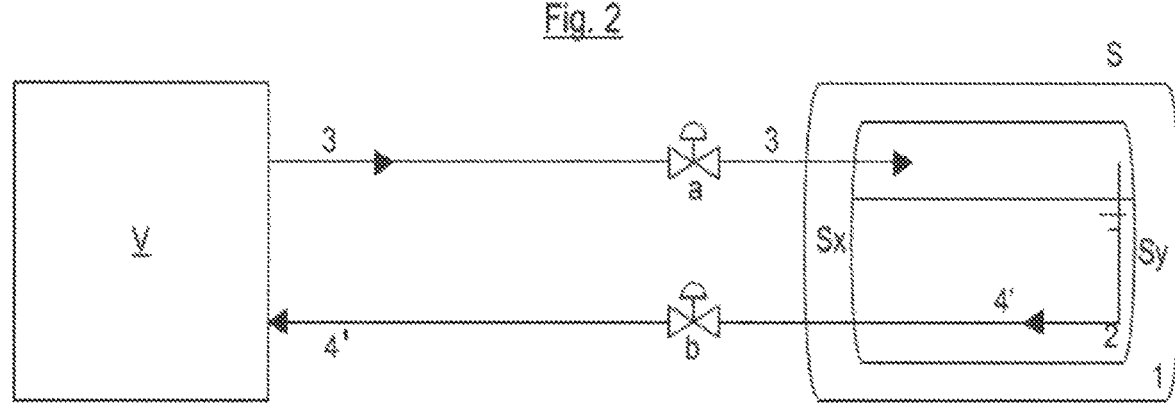
FIG. 2 shows an arrangement according to a first embodiment of the invention.

In FIG. 2, it will be noted that the second (return) transfer line 4', which is used for transferring the medium from the storage tank S into the liquefaction plant V, has a different configuration. In FIG. 2, an outlet of the first transfer line 3 into the storage tank S is provided adjacent to a first side wall, Sx, of the tank S and an inlet of the second transfer line is provide adjacent to a second side wall, Sy, the second side wall being the opposite side of the tank S to the first side wall. This means that the inlet of the second transfer line 4' (used for transferring gaseous medium from the storage tank S into the liquefaction plant V) is located as far as possible from the outlet of the first transfer line 3. Furthermore, the second transfer line 4' is routed so that when the liquid medium is present in the storage tank S, the length of the transfer line 4' which is routed in the section of the inner tank 2 containing the liquid medium is maximized. In other words, the second transfer line 4' is routed so that, in use, as much of the line 4' is surrounded by the liquid medium as possible.

Figure 3:
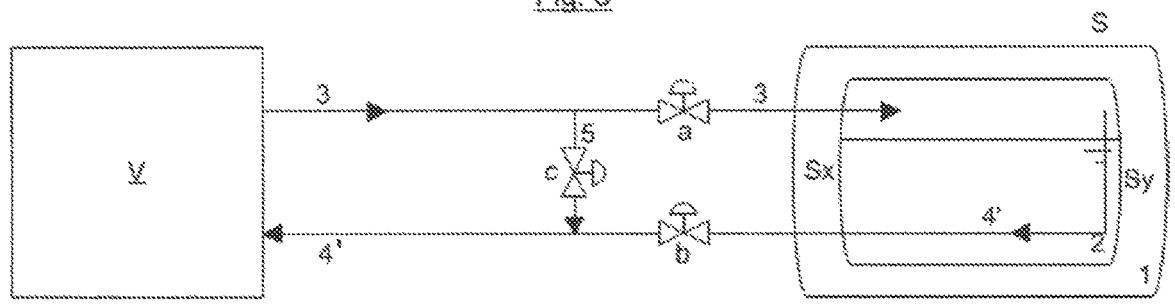
FIG. 3 shows an arrangement according to a second embodiment of the invention.

FIG. 3 shows an arrangement in which transfer lines 3 and 4' are arranged in the same way as shown in FIG. 2. In FIG.

3, a by-pass line 5 is provided between the first transfer line 3 and the second (return) transfer line 4', and a shut-off valve c is provided in the by-pass line 5. The bypass line 5 connects the first transfer line 3 at a point between the liquefaction plant V and the shut-off valve a, to the second transfer line 4' at a point between the liquefaction plant V and the shut-off valve b. In other words, the by-pass line 5 is connected to the first transfer line 3 upstream of shut-off valve a and connected to the second transfer line 4' downstream of shut-off valve b.

Figure 4:
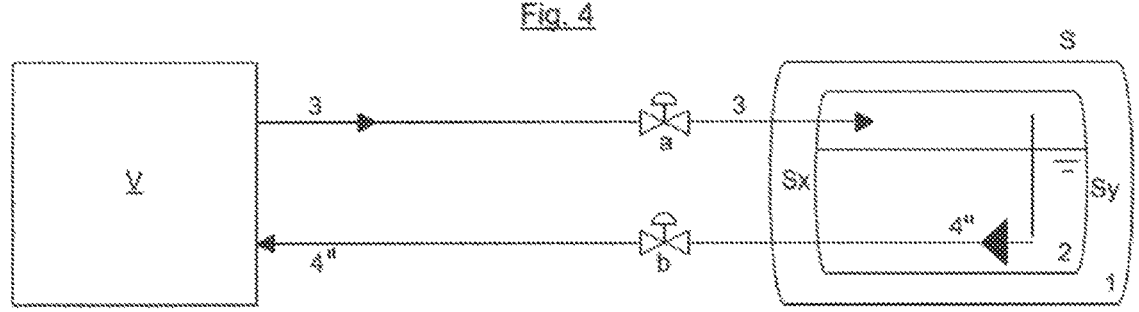
FIG. 4 shows an arrangement according to another embodiment of the invention.
Figure 5:
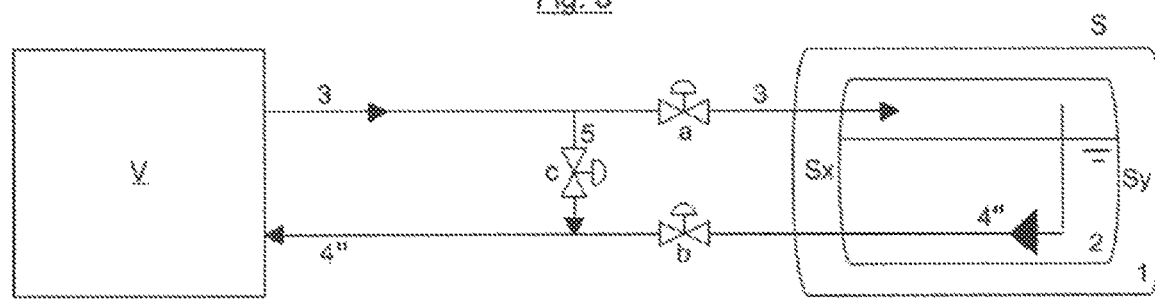
FIG. 5 shows an arrangement according to a further embodiment of the invention.

A further embodiment is shown in FIG. 4, and again similar components are given the same reference numerals In FIG. 4, the second (return) transfer line 4" is arranged in such a manner that when the liquid medium is present in the storage tank S (inner tank 2), the line 4" is routed at least partially through the portion of the storage tank S or of the inner tank 2 in which the liquefied medium is stored. FIG. 4 is similar to the embodiment of FIG. 2 except that the second transfer line 4" is arranged in a different position with respect to the sidewall of the tank. The embodiment of FIG. 5 corresponds to the embodiment of FIG. 4, but with the inclusion of the bypass line 5 and shut-off valve c, as in FIG. 3.

The arrangement of the transfer lines 3 and 4 within the storage tank, as represented in FIGS. 2 to 5, is an improvement of the arrangement of the transfer lines within the storage tank as represented in FIG. 1. If constructively possible, the arrangement as represented in FIG. 2, or FIG. 3 is always selected since this maximizes the operational benefits.

During a start-up procedure, prior to normal operation, it is necessary to cool down the storage tank to the desired operational temperature, at or near liquid helium temperature. In order to do this, cold gaseous helium is passed from the liquefaction plant V through transfer line 3 into the storage tank S. The cold gaseous helium passes through the tank and cools the tank. The cold gaseous helium is then recirculated back to the plant V through the return line 4.

Some embodiments described above include a by-pass line. It will be appreciated that the arrangement and use of the bypass line 5 is independent of the arrangement of the transfer lines within the storage tank.

The by-pass line 5 can be provided at any point which connects the first transfer line 3 upstream of shut-off valve a and the second transfer line 4 downstream of shut-off valve b. However, in a preferred embodiment the by-pass line 5 is provided in the immediate vicinity of, or substantially adjacent to, the storage tank. In practical terms, this means that it is arranged as close as constructively possible to the storage tank. This means that the lengths of those sections of the transfer lines that do not come in direct contact, during the cooling phase, with the medium circulating via the transfer lines and the bypass line are reduced or minimized. In other words, a maximum length of the transfer lines is cooled during the cooling phase, and only the relatively short lengths between the valves and the storage tank are not cooled.

The embodiments of the invention including by-pass lines have additional steps of operations, which are described below.

After a standstill phase or the renewed startup of the liquefaction plant V, before the transfer of liquefied medium into the storage tank S, a cooling of the transfer lines is carried out. In the transfer lines cooling phase, liquefied medium is led from the liquefaction plant V via the transfer lines 3 and 4'/4" as well as the bypass line 5. During this cooling phase, the shut-off valves a and b are closed and only the shut-off valve c of the bypass line 5 is opened. Since the medium used for cooling the transfer lines 3 and 4'/4" is now not led through the storage tank S, the heat is effectively prevented from being introduced from the transfer line 3 into the storage tank S. The liquefied medium is fed through the by-pass line 5 until a predetermined, desired temperature is reached.

After the cooling of the transfer lines 3 and 4'/4" to the desired temperature has occurred, the shut-off valve c is closed and the shut-off valves a and b are opened. This means that the medium liquefied in the liquefaction plant V is now transferred via the transfer line 3 directly into the storage tank S. At the same time, medium can be transferred from the storage tank S via the transfer line 4'/4" back into the liquefaction plant V.

While the invention has been described above with reference to one or more preferred embodiments, it will be appreciated that various changes or modifications may be made without departing from the scope of the invention as defined in the appended claims.

The entire disclosures of all applications, patents and publications, cited herein and of corresponding United Kingdom patent application No. GB 1711979.3, filed Jul. 25, 2017 are incorporated by reference herein.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An arrangement comprising:
   at least one liquefaction plant (V) for liquefying a gaseous medium to produce a liquefied medium,
   at least one storage tank (S) for storing the liquefied medium,
   a first transfer line (3) connected between the liquefaction plant (V) and the storage tank (S) for transferring liquefied medium from the liquefaction plant (V) into the storage tank (S),
   a second transfer line (4', 4") connected between the liquefaction plant (V) and the storage tank (S) for transferring gaseous medium from the storage tank (S) into the liquefaction plant (V), wherein the second transfer line (4', 4") is routed at least partially through an area of the storage tank (S) in which the liquefied medium is stored in use,
   at least one first shut-off valve (a) provided in said first transfer lines (3) and at least one second shut-off valve provided in said second transfer line (4', 4"),
   a bypass line (5) connecting the first and second transfer lines (3, 4', 4"), and a bypass shut-off valve (c) provided in the by-pass line (5), wherein the bypass line (5) connects the first and second transfer lines (3, 4', 4") at a point between the liquefaction plant (V) and the shut-off valves (a, b) of the first and second transfer lines, and a control element, wherein the control element is configured such that, after a standstill phase of the liquefaction plant (V) and before the transfer of liquefied medium from the liquefaction plant (V) into the storage tank (S), the control element performs a transfer line cooling phase, in which the shut-off valves (a, b) of the transfer lines are closed and the bypass line shut-off valve (c) is opened, so that liquefied medium from the liquefaction plant (V) can flow through via partial sections of the first transfer line (3), the bypass line (5), the second transfer line (4', 4") transfer lines (3, 4', 4"), and back into the liquefaction plant (V).

2. An arrangement according to claim 1, wherein an outlet of the first transfer line (3) into the storage tank (S) is provided adjacent to a first side wall of the tank (S) and an inlet of the second transfer line (4', 4") is provide adjacent to a second side wall, said second side wall being provided on the side of the tank (S) opposite to the first side wall.

3. The arrangement according to claim 1, wherein the bypass line (5) is arranged adjacent to the storage tank (S).

4. The arrangement according to claim 1, wherein the bypass line (5) is connected between a point on the first transfer line (3) upstream of the first shut-off valve (a) and a point on the second transfer line (4, 4', 4") downstream of the second shut-off valve (b).

5. The arrangement according to claim 4, wherein an outlet of the first transfer line (3) into the storage tank (S) is provided adjacent to a first side wall of the tank (S) and an inlet of the second transfer line (4', 4") is provide adjacent to a second side wall, provided on the side of the tank (S) opposite to the first side wall.

6. The arrangement according to claim 1, wherein the second transfer line (474") is routed through the area of the storage tank (S) from one end of the storage tank to another end of the storage tank.

7. The arrangement according to claim 1, wherein the storage tank (S) is a double-walled tank, having an outer tank (1) and an inner tank (2).

8. The arrangement according to claim 1, wherein at least some of the transfer lines are vacuum insulated.

9. A method for cooling the transfer lines (3, 4, 4') of an arrangement according to claim 1, after a standstill phase of the liquefaction plant (V), the method comprising:
operating in a cooling mode wherein
liquid medium is fed through the by-pass line that connects the first transfer line and the second transfer line, so as to by-pass the storage tank (S), and
switching to a normal transfer mode wherein
liquefied medium is transferred from the liquefaction plant (V) into the storage tank (S).

10. The method according to claim 9, wherein the cooling mode comprises:
closing the shut-off valves (a, b) in the first and second transfer lines, and
opening the bypass line shut-off valve (c), so that liquefied medium is led from the liquefaction plant (V), through the first transfer line (3), the bypass valve (5), and the second transfer line (4', 4"), and back into the liquefaction plant (V).

11. The method according to claim 9, wherein the cooling mode is carried out until a predetermined temperature has been reached in at least one section of the first and second transfer lines (3, 4, 4', 4').

12. The method according to claim 9, wherein the medium to be liquefied is hydrogen, a noble gas, oxygen, nitrogen, or a hydrocarbon mixture.

13. The arrangement according to claim 1, wherein the storage tank (S) is a vacuum insulated storage tank.

14. The arrangement according to claim 8, wherein all of the transfer lines are vacuum insulated.

15. The method according to claim 9, wherein the medium to be liquefied is hydrogen, helium, neon, argon, oxygen, nitrogen, or natural gas.

16. A method for cooling the transfer lines (3, 4, 4') of an arrangement, said arrangement comprising
at least one liquefaction plant (V) for liquefying a gaseous medium to produce a liquefied medium,
at least one storage tank (S) for storing the liquefied medium,
a first transfer line (3) connected between the liquefaction plant (V) and the storage tank (S) for transferring liquefied medium from the liquefaction plant (V) into the storage tank (S),
a second transfer line (4', 4") connected between the liquefaction plant (V) and the storage tank (S) for transferring gaseous medium from the storage tank (S) into the liquefaction plant (V), wherein the second transfer line (4', 4") is routed at least partially through an area of the storage tank (S) in which the liquefied medium is stored in use,
at least one first shut-off valve (a) provided in said first transfer lines (3) and at least one second shut-off valve provided in said second transfer line (4', 4"),
a bypass line (5) connecting the first and second transfer lines (3, 4', 4"), and a bypass shut-off valve (c) provided in the by-pass line (5), wherein the bypass line (5) connects the first and second transfer lines (3, 4', 4") at a point between the liquefaction plant (V) and the shut-off valves (a, b) of the first and second transfer lines,
the method comprising, after a standstill phase of the liquefaction plant (V):
(a) operating in a cooling mode wherein liquid medium is fed through the by-pass line that connects the first transfer line and the second transfer line, so as to by-pass the storage tank (S), wherein the cooling mode comprises:
closing the shut-off valves (a, b) in the first and second transfer lines, and
opening the bypass line shut-off valve (c), so that liquefied medium is led from the liquefaction plant (V), through the first transfer line (3), the bypass valve (5), and the second transfer line (4', 4"), and back into the liquefaction plant (V), and
(b) switching to a normal transfer mode wherein liquefied medium is transferred from the liquefaction plant (V) into the storage tank (S).

17. A method for cooling the transfer lines (3, 4, 4') of an arrangement, said arrangement comprising
at least one liquefaction plant (V) for liquefying a gaseous medium to produce a liquefied medium,
at least one storage tank (S) for storing the liquefied medium,
a first transfer line (3) connected between the liquefaction plant (V) and the storage tank (S) for transferring liquefied medium from the liquefaction plant (V) into the storage tank (S),
a second transfer line (4', 4") connected between the liquefaction plant (V) and the storage tank (S) for transferring gaseous medium from the storage tank (S) into the liquefaction plant (V), wherein the second transfer line (4', 4") is routed at least partially through an area of the storage tank (S) in which the liquefied medium is stored in use, at least one first shut-off valve (a) provided in said first transfer lines (3) and at least one second shut-off valve provided in said second transfer line (4', 4"), a bypass line (5) connecting the first and second transfer lines (3, 4', 4"), and a bypass shut-off valve (c) provided in the by-pass line (5), wherein the bypass line (5) connects the first and second transfer lines (3, 4', 4") at a point between the liquefaction plant (V) and the shut-off valves (a, b) of the first and second transfer lines, the method comprising, after a standstill phase of the liquefaction plant (V):

(a) operating in a cooling mode wherein liquid medium is fed through the by-pass line that connects the first transfer line and the second transfer line, so as to by-pass the storage tank (S), and (b) switching to a normal transfer mode wherein liquefied medium is transferred from the liquefaction plant (V) into the storage tank (S), wherein the cooling mode is carried out until a predetermined temperature has been reached in at least one section of the first and second transfer lines (3, 4, 4', 4').

* * * * *